US008849296B2

(12) United States Patent
Song

(10) Patent No.: US 8,849,296 B2
(45) Date of Patent: Sep. 30, 2014

(54) DYNAMIC OPTIMIZATION OF THE UPLINK AND DOWNLINK BANDWIDTHS BASED ON CALENDAR DATA

(75) Inventor: Yuefeng Song, Shijiazhuang (CN)

(73) Assignee: Empire Technology Development LLC, Wilmington, DE (US)

(*) Notice: Subject to any disclaimer, the term of this patent is extended or adjusted under 35 U.S.C. 154(b) by 84 days.

(21) Appl. No.: 13/514,284

(22) PCT Filed: Jun. 27, 2011

(86) PCT No.: PCT/CN2011/076412
§ 371 (c)(1),
(2), (4) Date: Jun. 6, 2012

(87) PCT Pub. No.: WO2013/000109
PCT Pub. Date: Jan. 3, 2013

(65) Prior Publication Data
US 2013/0065601 A1    Mar. 14, 2013

(51) Int. Cl.
*H04W 72/00* (2009.01)
*H04W 28/26* (2009.01)
*H04W 28/20* (2009.01)

(52) U.S. Cl.
CPC .............. *H04W 28/26* (2013.01); *H04W 28/20* (2013.01)
USPC ...................... 455/452.1; 455/450; 455/452.2

(58) Field of Classification Search
CPC ..................................................... H04W 28/26
USPC .................................... 455/452.1, 450, 452.2
See application file for complete search history.

(56) References Cited

U.S. PATENT DOCUMENTS 7,324,554 B1    1/2008  Ginjpalli et al.
2002/0161822 A1  10/2002  Hamada et al.
2009/0279483 A1* 11/2009  Falchuk et al. .............. 370/328
2012/0059937 A1*  3/2012  Dheap et al. ................. 709/226

FOREIGN PATENT DOCUMENTS

CN    1381109 A    11/2002
CN  101383880 A     3/2009

OTHER PUBLICATIONS

International Search Report dated Mar. 22, 2012 as received in application No. PCT/CN2011/076412.
Written Opinion of the International Searching Authority dated Mar. 22, 2012 as received in application No. PCT/CN2011/076412.
K.L Dias et al. "Approaches to resource reservation for migrating real-time sessions in future mobile wireless networks"Wireless Networks, vol. 16, Nr. 1 (2010) , p. 39-56.
Sivaradje, G. and Venkatachalam, K. and Dananjayan, P. (2004) Dynamic Resource Prediction and Reservation Scheme for Mobile Multimedia Networks. In: MoMM2004, Sep. 22-24, 2004, Bali.
Dynamic channel assignment technique in TD-SCDMA system, Nov. 20, 2007, pp. 1-7.
TD-SCDMA key technical presentations, Mar. 28, 2008, pp. 1-4.

* cited by examiner

*Primary Examiner* — Barry Taylor
(74) *Attorney, Agent, or Firm* — Maschoff Brennan

(57) ABSTRACT

A communications system can be adapted to perform a method for optimizing bandwidth by analyzing calendar data. Such as method can include: receiving an indication of an event via a calendaring system; identifying a property of the event, event time, and a duration of the event; determining an estimation of bandwidth usage of the mobile device based on the identified property and duration of the event; and allocating bandwidth to the mobile device at the event time and during the duration of the event based on the estimation of the bandwidth usage of the mobile device.

28 Claims, 6 Drawing Sheets

DYNAMIC OPTIMIZATION OF THE UPLINK AND DOWNLINK BANDWIDTHS BASED ON CALENDAR DATA

BACKGROUND

As communication technologies continue to advance in use and demand, allocation of uplink and downlink bandwidths continues to be problematic. When allocations between uplink and downlink bandwidths are not sufficient, users can experience lowered quality, reliability, and accessibility.

In some instances, mobile communication systems may not be configured to sufficiently allocate uplink and downlink bandwidths over time periods and in real time. Communications professionals have found it to be difficult to configure a base station to be capable of dynamically allocating the downlink and uplink bandwidths to users. It can also be difficult to configure a base station to adjust the allocation of uplink and downlink bandwidths for users in near real time. The lack of capabilities of adequate dynamic adjustment of the user downlink and uplink bandwidths thus negatively affects the user experience.

SUMMARY

Generally, the present technology includes the dynamic optimization of uplink and downlink bandwidths based on calendar data. The technology includes computing systems having system components configured for implementing uplink and downlink processes so as to be capable of implementing dynamic optimization of bandwidths based on calendar data. The technology also includes the methods that can be utilized for dynamic optimization of uplink and downlink bandwidths based on calendar data, which methods can include computing methods and methods that include communicating calendar data between computing systems over a network.

In one embodiment, a method is provided for optimizing bandwidth in a mobile communication system including a mobile device with a calendaring system operating thereon. Such as method can include: receiving an indication of an event via the calendaring system; identifying a property of the event, event time, and a duration of the event; determining an estimation of bandwidth usage of the mobile device based On the identified property and duration of the event; and allocating bandwidth to the mobile device at the event time and during the duration of the event based on the estimation of the bandwidth usage of the mobile device. In one aspect, the property of the event can include an indication of a scheduled telephone call, text, email, or connection to the Internet implying increased bandwidth usage during the event. In one aspect, the property of the event can include an implied indication that the user will be occupied with an activity which implies decreased bandwidth usage during the event.

In one embodiment, a computer-readable storage medium is provided that includes computer-executable instructions stored thereon that are executable by a computing device, such as a base station, capable of communicating with a mobile device via a wireless communication system for dynamic optimization of uplink and downlink bandwidths based on calendar data. The computer-executable instructions can be executable to perform operations including: receiving an indication of an event via a calendaring system of the computing device; identifying a property of the event, event time, and a duration of the event; determining an estimation of bandwidth usage of the mobile device based on the identified property and duration of the event; and allocating bandwidth to the mobile device at the event time and during the duration of the event based on the estimation of the bandwidth usage of the mobile device. In one aspect, the property of the event can include an indication of a scheduled telephone call, text, email, or connection to the Internet implying increased bandwidth usage during the event.

In one embodiment, a wireless communication system can be configured to be capable of implementing dynamic optimization of uplink and downlink bandwidths based on calendar data. The wireless communications system can include: a bandwidth controller configured to allocate bandwidth of the wireless communication system; and a mobile device capable of communicating with the bandwidth controller in order to request an allocation of bandwidth in the wireless communication system, wherein the bandwidth controller allocates the bandwidth of the wireless communication system according to the method described herein.

In one aspect, a bandwidth controller can be configured for use in a wireless communication system including a plurality of wireless mobile devices. The bandwidth controller can include a computer-readable storage medium having computer executable instructions for implementing dynamic optimization of uplink and downlink bandwidths based on calendar data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
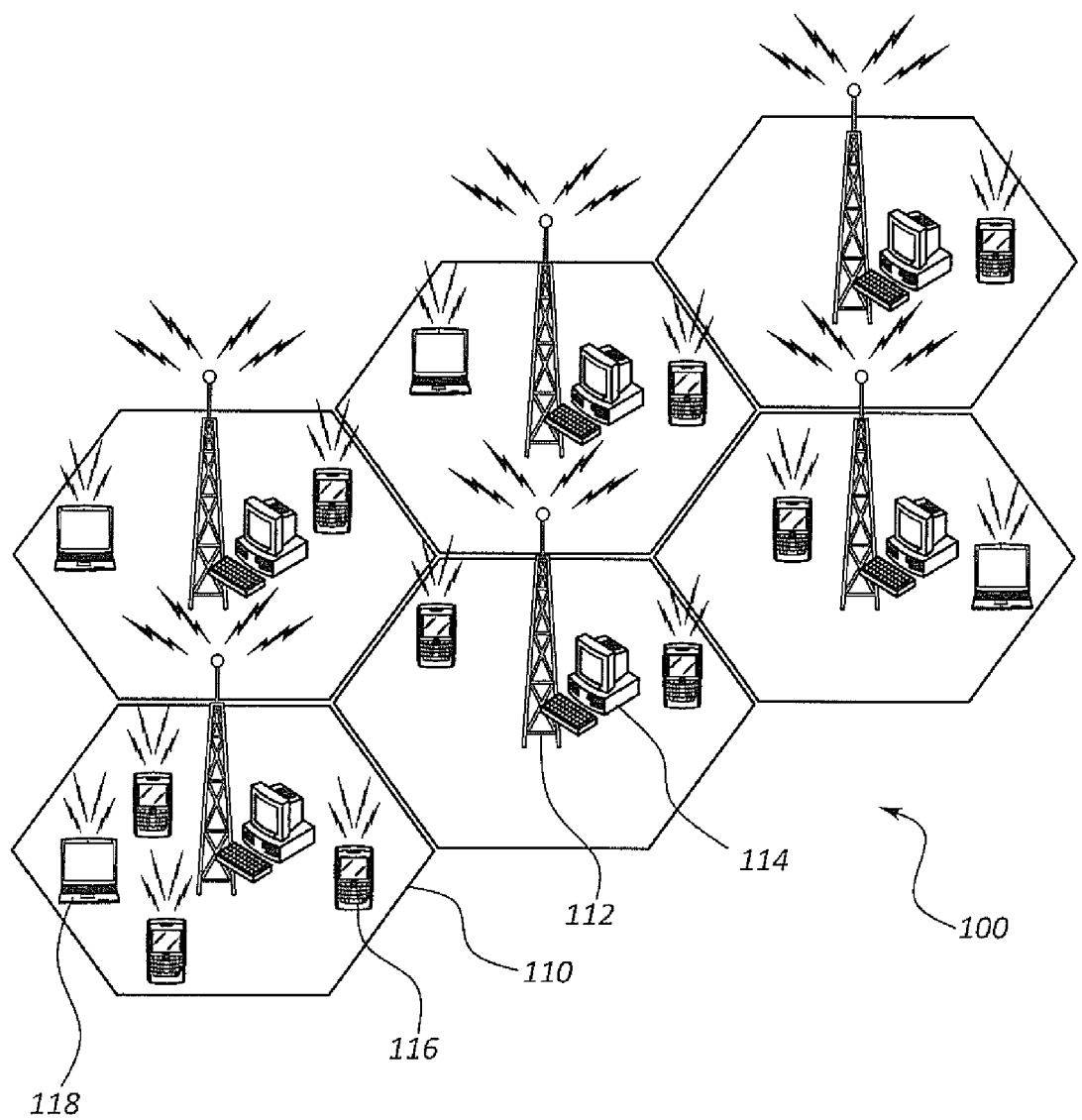
FIG. 1 includes a schematic illustration of an embodiment of a mobile communications system that includes one or more cellular areas.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, a mobile communications system can be configured for dynamic allocation of uplink and downlink bandwidths based on calendar data. This can include a base station that is configured to dynamically allocate the downlink and uplink bandwidths to mobile device uses. The dynamic allocation of bandwidths can include adjusting the downlink and uplink bandwidths for users in near real time based on calendar data. The dynamic adjustment of the user downlink and uplink bandwidths can be performed by the base station in a manner that does not affect the user experience can be performed based on the user behavior prediction for bandwidth usage on certain calendar events.

FIG. 1 illustrates an embodiment of a mobile communications system 100 that includes one or more cellular areas 110 each with a base station 112. The communications system 100 also operates with a base station 112 that includes a computing system 114 that is capable of performing computing methods to optimize bandwidth allocation based on calendar data. The computing system 114 can be substantially as the computing system 600 described herein in connection with FIG. 6. Each cellular area 110 may also include any number of mobile communications devices 116 (e.g., mobile phone) and/or any number of mobile computing systems 118.

Figure 2:
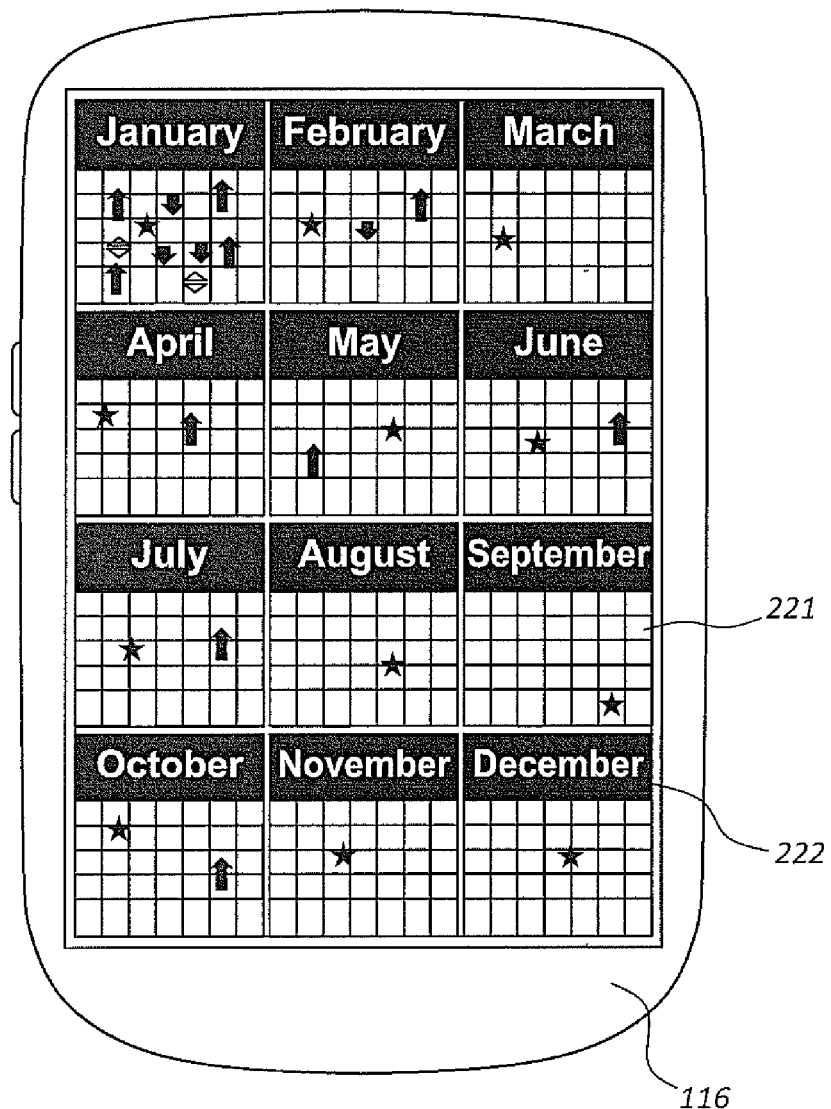
FIG. 2 includes a schematic illustration of an embodiment of a mobile device that can operate on the mobile communications system of FIG. 1.

As shown in FIG. 2, the mobile phones 116 and mobile computing systems 118 (not shown, but which can be configured similarly) can include calendaring modules 220 that are configured to receive and/or provide calendar event data for calendar events 224. The calendaring module 220 can be configured to present a graphical calendar interface (GCI) 222 illustrating a calendar 221. While the calendar 221 of the GCI 222 is shown to show all 12 months, the CGI 222 may be adapted to show any calendar timeframe ranging from minutes, hours, days, weeks, months, and/or regular or custom portions thereof.

The CGI 222 can also show calendar events 224. Some calendar events 224 can be characterized as having a bandwidth property that identifies a projected amount of bandwidth. These calendar events 224 can, for example only, be described as high bandwidth events 226, low bandwidth events 228, or medium bandwidth events 230. These calendar events 224 can be distributed across a calendar 221. For example, if the present time period was January, a calendar 221 may show more calendar events 224 that are described to be high bandwidth events 226, low bandwidth events 228, or medium bandwidth events 230. These represent calendar events 224 occurring in the near future, and which calendar events 224 can be used for dynamically adjusting bandwidth allocations as described herein.

The calendar events 224 can include single calendar events or repeating calendar events that occur on a cycle of the calendar. The calendar events 224 can be automatically, manually, or remotely entered in the calendar 221 of the mobile phone 116. The calendar events 224 can include calendar event data that is useful for the methods described herein. That is, the calendar event data can be available to the use by the mobile phone 116 by a calendar program, such as Outlook™. Generally, any computing device of the communications system 100 can be configured to use the calendar event data. The calendar events 224 can be described by calendar event data that provides information about the calendar event 224 and user communication usage in uplink and downlink activities. The calendar event data can be used for medium and long term trend adjustments as well as the additional ability to meet requirements of real-time or near-real-time adjustments of uplink and downlink bandwidth allocations. The ability to adjust allocations of uplink and downlink bandwidths based on calendar event data or changes in calendar event data can provide real time dynamic adjustability.

In one embodiment, the bandwidths available can be adjusted over a future specific period can be determined by tracking and using calendar event data of events in a user-defined calendar application. The analysis of the type and property of events in the calendar application can be used to more accurately predict requirements of the user for the uplink and downlink bandwidths in a certain specific period of time in the future. That is, calendar event data entered into or retrieved from a user-defined calendar application can be used to adjust the uplink and downlink bandwidths allocated to the user at a certain time point or over a certain time period related to the calendar event data.

Also, statistical analysis of calendar event data in the user-defined calendar application can be used to obtain more accurate requirements for the uplink and downlink bandwidths for future allocation estimations. The calendar event data can be provided to a base station and then processed in order to obtain guidance in the allocation of the uplink and downlink bandwidths for the user. Determining bandwidth allocation from calendar event data from one or more users can be aggregated in order to adjust the availability and allocation of bandwidths over an entire mobile communications system. This can also include aggregation and distribution of calendar event data between base stations over a network. Calendar event data obtained at one base station can be utilized by a different base station when and if that calendar event data becomes useful, such as when a user moves between base stations coverage at times related to the calendar event data.

In one embodiment, the communications system can include a mobile device having a calendaring application configured to obtain and/or provide calendar event data. The calendar event data can be obtained from the calendaring application and provided to a base station, and exchange of the calendar event data can occur between base stations.

The mobile device can include a calendar function that is a standalone calendar application, and another application can obtain calendar event data therefrom in order to be used for dynamic bandwidth allocation. Thus, one or more applications can cooperate to obtain, provide or use calendar event data for dynamic bandwidth allocation. The calendaring application can be any of the calendar applications available that can be used with a mobile device. Examples of calendar applications that can be used for calendar event data include Outlook™, or Google Calendar™, as well as others. The calendar events described in the calendaring application can provide calendar event data with high accuracy because the data can be input directly into the calendaring application. For example, the calendar event data can be obtained from data entered into the calendaring application by voluntary, active submission by the user. If the event changes, the user likely can actively or passively obtain a revised calendar with revised calendar data.

In one embodiment, the calendar event data can be obtained from events and reminders set by the user in the calendaring application. The calendar events can include individual natural properties, such as start time, end time, event type, location, and the like. These natural properties can provide data that can be processed in order to more accurately determine requirements of the user for the communications bandwidth during the process of events for some time or time period, such as the near future.

In one embodiment, the communications system can be configured to consider different conditions. This can include the calendar event data to include the start time and end time of an event. The start time and end time of the event can represent a continuous period of time for particular behavior patterns of the user. During this time period the behavior patterns and requirements of the user may not change significantly.

In one embodiment, the communications system can be configured to consider a property of an event. The property of the event can be used to determine the requirements of the user for communications and downlink and uplink bandwidths during the period of the event. For example, if the property of the event is business dinners or yoga exercises, during the period when this event lasts, the communications system can have a certain confidence of lower bandwidth requirements. The type of event can be utilized as an event property in order to predict that the requirements of the user for calling or utilizing uplink and/or downlink bandwidth requirements. The allocation of bandwidths can be determined based on the type of event activity.

In one embodiment, the communications system can consider location data with the calendar event data. The location data can include location or likely location of a user within a coverage area of the base station where the event will occur. The location can be used for determining bandwidth allocation and adjusting in a dynamic manner the changes of requirements for communications within a network and between networks in the near future.

In one embodiment, the communications system can consider various other properties of the calendar event for use in dynamic bandwidth allocation adjustment and prediction. The other properties can include event information that can provide more properties of the event to determine the level of possible bandwidth usage by the user over a time period of the event. In one example, a calendar event having a property of "Do Not Disturb", can indicate the user does not want to be disturbed during the event and therefrom bandwidth requirements can be reduced. On the other hand, a calendar event having a property of "Teleconference" can indicate high call usage, but may indicate low data usage.

In another embodiment, historical data usage trends on repeating calendar events can be used to determine bandwidth allocation for a user. For example, if during "study" calendar events the user streams live media, then the allocation may be high. On the other hand, a "nap" event may have lower bandwidth allocation.

Also, the calendaring application can be configured to allow a user to identify if they will be making a call or using data functions during the event. The information can be prompted to the user, and the user can input data in response to the prompt in order to classify the level of bandwidth requirement for a particular calendar event. Thereby, the communications system can dynamically adjust bandwidth allocation based on a user directly specify whether the event will need or use services of call and data communications, and the level of data services that may be used.

The computing system can include a calendaring module that is configured to implement the processing of calendar event data in dynamically adjusting bandwidth allocation.

The computing system can include event classification and event statistics for each calendar event in the calendar application of a user in accordance with the natural properties of the event and any additional properties of the event to sum up the communication requirements of the user at a certain time. The certain time can be around or exactly the time of the calendar event. The certain time can also include the near future, such as the next minute, hour, day, week, month, or the like. For example, a simple classification obtained from keywords can be input by the user or from selections from selectable icons or dropdown menus to provide simple classifications of the event. Simple classifications can provide specific data usage estimates.

In one embodiment, the event can be classified as an event with low bandwidth requirements. For example, certain business activities, such as business dinners, business meetings, business negotiations, and the like can have low bandwidth requirement classification. During the process of these events, the user basically has no time to use their mobile phone and thereby the allocation of bandwidths can be reduced for that event. Thus, certain events can be classified as having low communications needs, and thus the communication requirements and uplink and downlink requirements thereof are both low.

Some specific examples of daily activities with low bandwidth allocation can include: body building, swimming, going to the hot spring, travelling by air, writing, reading, cooking, medical protocols, or the like. During the process of these events, the user may not use the mobile phone for a scheduled time, or will feel inconvenient, have no way, or not be allowed to use the mobile device. Thus, the communications bandwidth requirements thereof will be reduced.

In one embodiment, event data can be identified as having high bandwidth allocation requirements. Such high bandwidth allocation events can include phone conferences, such as pre-determined out-of-office phone conferences, or pre-determined out-of-office calling with other users, or the like. The proceeding of such events often need to use the mobile device, during which time, users will have certain requirements for both the downlink and uplink bandwidths of voice services.

In one embodiment, a the communications system can aggregate a large number of user calendar event data for use in guiding dynamic adjustment of the uplink and downlink bandwidths within the coverage area of every base station and between base stations. The aggregation of user calendar event data can be used to determine bandwidth allocation in the near future, such as for minutes, hours, days, weeks, or the like.

In one embodiment, the communications system can obtain calendar event data that includes certain direct properties for events. The direct properties of the events can be selected by the user in free forms so that the user can enter any data. Also, select properties of an event can be provided to the user for selection, such as from dropdown menus. Selected properties can be useful in determining the communication requirements for bandwidth allocation of the user at a certain time. The certain time can be somewhere in the near future on the users calendar.

In one embodiment, the calendar data can include location data that includes the properties of a location of an event. Some locations may facilitate high bandwidth usage, while others may not. For example, church locations can have low bandwidth usage requirements, while libraries may have high bandwidth usage due to mobile internet research. The location property data may depend on passive event property reports of data related to the properties of the location. This can include property reports, such as the location being a place for business meetings. The event property can be entered by the user or obtained from internet data regarding the event location. The event property can be dependent on the active user location detection, such as GPS positioning or location based determination.

In one embodiment, the computing system can include an incentive module that is configured to provide incentive to a user such that the user accurately identifies a level of communications system usage for an event and then to actually use the identified level during the event. It can be beneficial for the incentive module to receive accurate usage levels that are low, medium, or high because each identified level allows for an adjustment in bandwidth allocation. Any accurate allocation can be deemed as beneficial even if the user is using a high amount of bandwidth. For example, a certain incentive module can be configured such that if the level of bandwidth usage that is chosen by the user matches the reality of the actual level of bandwidth during the event, then the user receives an incentive. In one example, if for an event, the user selected "high calling requirement properties", and in fact the user in the event has indeed made frequent calls with a mobile phone, the user can be provided an incentive by the incentive module. The incentive can include additional minutes, rewards, phone charge discount, accumulative credit points, or the like.

Alternatively, if the user does not make a high volume of calls during the event with high calling requirement properties, then incentive module can inhibit an incentive. The incentive module may also withdraw incentives or remove incentives or provide punishment if a certain bandwidth usage level is identified for an event and the actual usage is much different.

In one embodiment, the communications system can be configured for performing error analysis and adjustment with regard to bandwidth allocations. The communications system can obtain data regarding errors in future or near-future estimation or adjustment of communication requirements and uplink and downlink bandwidth requirements within a network and between networks. The error can be based on events in a calendaring application. The events can depend on user behaviors to carry out and update events in a calendar application. Through statistics of planning and implementation the statuses of different events for a user, the behavior of the user for certain events can be obtained as event data for use in determining allocation. That is, the amount of bandwidth usage by a user during a certain type of event can be used as event data.

Also, the weight of usage of event data for a user can depend on the user's behavior being consistent across similar events. When a user is consistent in bandwidth usage across similar events, this user's event data can be weighted higher. On the other hand, if a user is not consistent in usage across similar events, this user's data can be weighted lower. As such, sporadic and random usage behavior of a user across similar events resulting in a lower "behavior credit" for the user.

The communications system can be upgraded from a fixed allocation proportion configuration between the uplink and the downlink bandwidths to a dynamically adjustable allocation based on calendar event data. The calculations can be performed at a base station from data obtained from a mobile device.

Figure 3:
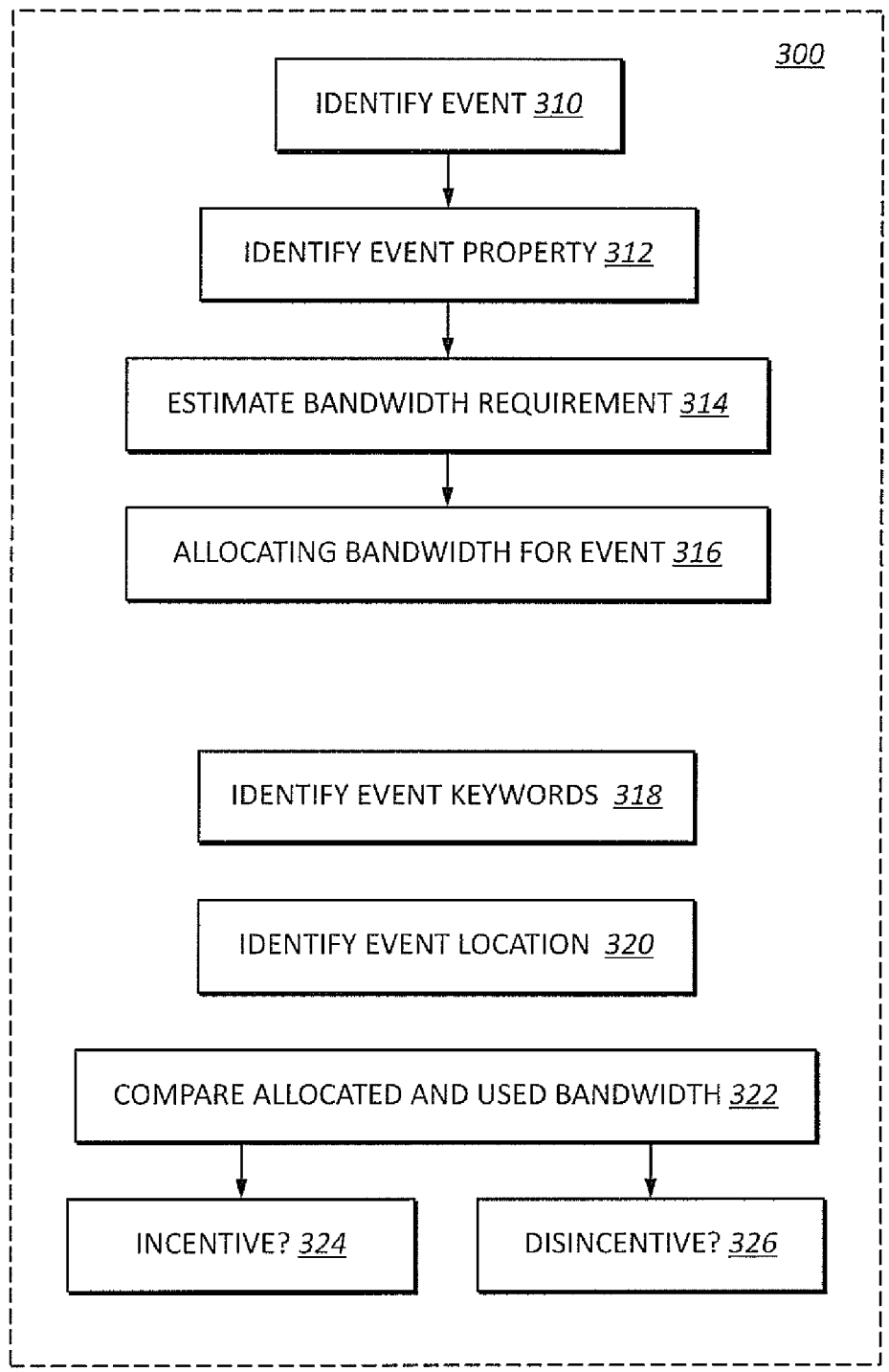
FIG. 3 illustrates a flow diagram for a method for optimizing bandwidth in a mobile communication system.

FIG. 3 illustrates a flow diagram for a method 300 for optimizing bandwidth in a mobile communication system including a mobile device with a calendaring system operating thereon. A calendaring system can be operating on the mobile device and/or communications system. The method 300 can include: receiving an indication of an event via a calendaring system ("IDENTIFY EVENT," block 310); identifying a property of the event, event time, and a duration of the event ("IDENTIFY EVENT PROPERTY,". block 312); determining an estimation of bandwidth usage of the mobile device based on the identified property and duration of the event ("ESTIMATE BANDWIDTH REQUIREMENT," block 314); and allocating bandwidth to the mobile device at the event time and during the duration of the event based on the estimation of the bandwidth usage of the mobile device ("ALLOCATING BANDWIDTH FOR EVENT." block 316).

The property of the event can include, for example, an indication of a scheduled telephone call, text, email, or connection to the Internet implying increased bandwidth usage during the event. In one aspect, the property of the event can include an implied indication that the user will be occupied with an activity which implies decreased bandwidth usage during the event.

The process of identifying an event property for a particular event can include searching a description of the event and identifying keywords of the event ("IDENTIFY EVENT KEYWORDS," block 318). The description can include keywords that are associated with bandwidth usage levels. As such, an estimation of bandwidth usage of the mobile device can be determined based on the event property. The description and keywords can be related to predefined levels of usage or they can be related to a level of usage by the user. This calendar event data can then be used for identifying an estimated bandwidth associated with the identified keywords. Keywords generically include one or more words.

The process can also include identifying an estimated bandwidth associated with the identified keywords. That is, certain keywords can be associated with or defined to have certain bandwidth requirements. The process can also include identifying an average required bandwidth for a keyword. As such, the process can determine the bandwidth usage of events having certain keywords, and then determine an average bandwidth of the keywords. For example, a mobile device can access event data for previous events with the identified keywords, and determine the estimated or averaged bandwidth allocation. The process can include identifying an estimated bandwidth associated with the identified keywords by identifying an average required bandwidth for a plurality of mobile devices connected to the wireless communication network in previous events with the identified keywords. The methods can be conducted with calendar event data from one or more mobile devices.

In the process, the bandwidths in the communications system can include downlink and uplink bandwidths. As such, the process of determining an estimation of the bandwidth usage for an event can include determining an estimated uplink bandwidth usage and an estimated downlink bandwidth usage. These determinations can be done separately or together. The process can then use the estimated uplink and downlink bandwidths in determining a bandwidth allocation for a user during a calendar event. The allocation of the bandwidth to a mobile device can be for a particular event time and for a particular duration of the event. The allocation can also be based on the estimation of the bandwidth usage, and the dynamic allocation can include allocating uplink bandwidth and downlink bandwidths based on the estimated uplink bandwidth and the estimated downlink bandwidth, respectively.

The method 300 can also include identifying a location of the event and location data related to the location ("IDENTIFY EVENT LOCATION," block 320). The event location can provide location data that is relevant in determining bandwidth usage for an event. The location can be identified with a particular event setting that either promotes or inhibits mobile communications, and thereby the location data can be used to determine bandwidth allocations. The location identified can be by any of the various means of location identification ranging from triangulation, GPS, AGPS, coordinates, maps, addresses, or the like. The location can be defined by the buildings and activities associated with the location. Accordingly, the location data can be useful in allocating bandwidth to one or more particular mobile devices. This can include reserving the allocated bandwidth at the event time and during the duration of the event in a coverage area of the wireless communication network at the identified location.

The property of an event that can be identified can also include an express indication of the level of bandwidth usage likely for an event. That is, the event can have an express indication that the bandwidth will be high, low, medium, or other amount. The base station can then allocation an amount of bandwidth for an event based on an express indication of bandwidth usage during the event. The base station can then allot bandwidth for the mobile device at the event time during the duration of the event.

In one embodiment, the method 300 can include determining whether or not an allocated amount of bandwidth for an event was used during the event by comparing the allocated bandwidth with actual bandwidth usage ("COMPARE ALLOCATED AND USED BANDWIDTH," block 322). This can include determining if the mobile device use increased bandwidth during the duration of the event, used decreased bandwidth, or used about the same bandwidth of allocated to actual used bandwidth. Variances between allocated and used bandwidths can have certain consequences. Overuse can congest the communications system. Underuse can waste communication system resources.

In one embodiment, the method 300 can determine whether or not to provide an incentive to a user in view of the level of bandwidth allocated for a calendar event compared to the actual level of bandwidth used during the event ("INCENTIVE?," block 324). The incentive can be provided if the amount of usage is close to the allocated amount because this results in an efficient communications system. As such, it can be advantageous to incentivize users to accurately identify and predict the amount of usage for an event. For example, if a user identifies an event as a high use event and it is determined that the mobile device actually used an increased amount of bandwidth (e.g., high use) during the duration of the event as expressly indicated, it can be beneficial to provide the user with an incentive.

The process can also include a property of the event being an express indication of lower usage during an event. The base station can then determine an allocation of bandwidths based on the express indication that the mobile device will use decreased bandwidth at the event time during the duration of the event. If after the event time and duration of the event, it is determined that the mobile device actually used decreased bandwidth during the duration of the event, then an incentive can be provided. If it is determined that the mobile device used decreased bandwidth during the duration of the event as expressly indicated, providing the user with an incentive can prove the communications system with higher efficiency. The incentive can also induce the user to identify more calendar events that have lower bandwidth requirements. In some examples, the incentive can include a price discount, credit points, or increased bandwidth during a future event.

However, if it is determined that the mobile device used increased bandwidth during the duration of the event in opposition to an expressly indicated lower bandwidth, then a disincentive may be given to the user ("DISINCENTIVE?," block 326). If it is determined that the user should receive a disincentive, then the communications system can provide the disincentive to the user. For example, the disincentive can include a degradation of priority during a future event.

Figure 4:
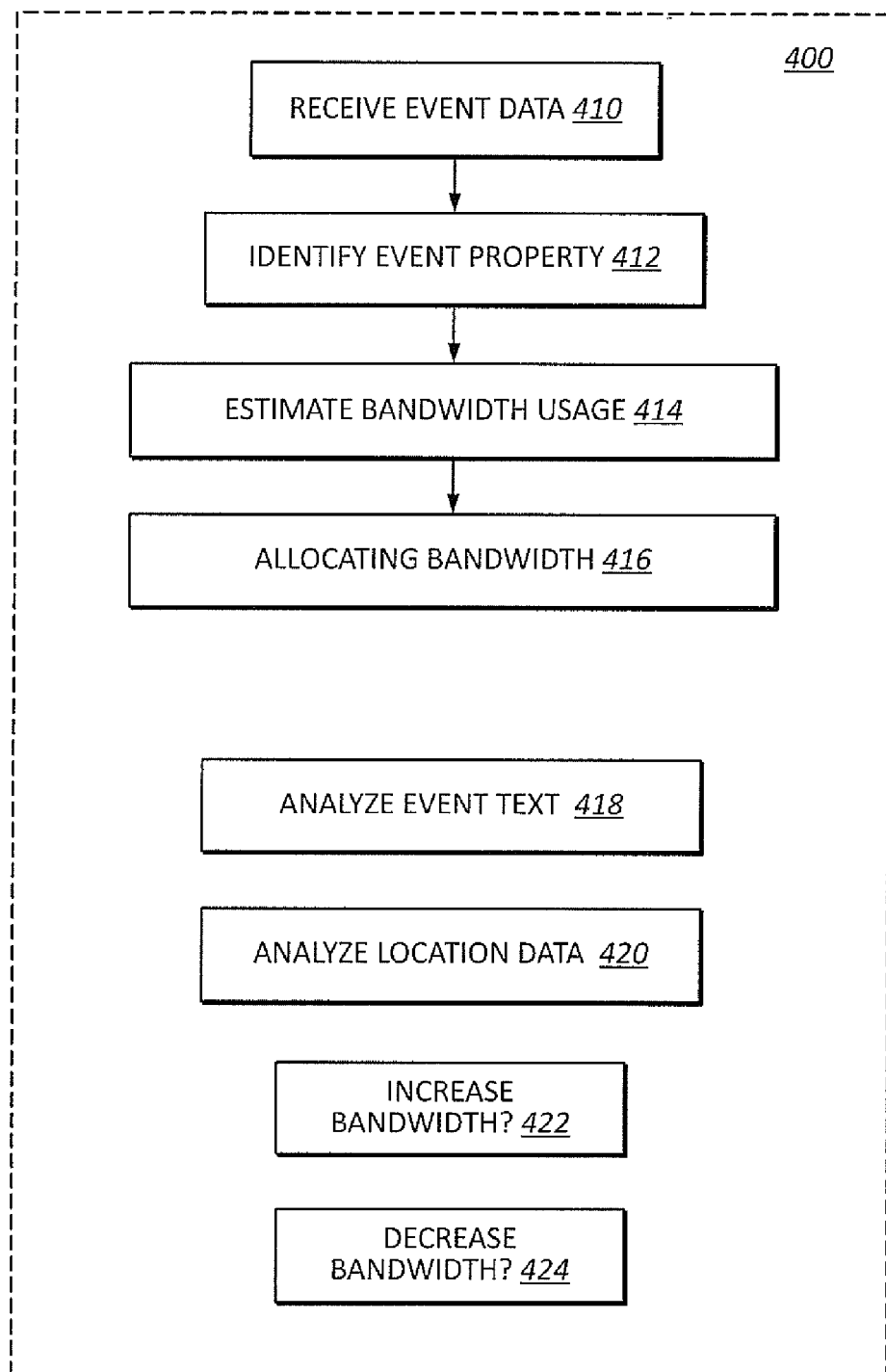
FIG. 4 illustrates a flow diagram of an embodiment of a method performed on a computing device at a base station in order to optimize bandwidth in a mobile communication system.

In one embodiment, the communications system can include a computer-readable storage medium that includes computer-executable instructions stored thereon that are executable by a computing device capable of communicating with a mobile device via a wireless communication system. The computing device can be associated with a base station as illustrated in FIG. 1. The computing device can compute the computer-executable instructions in order to perform operations of a computing method. FIG. 4 illustrates a flow diagram of an embodiment of the computing method 400 that can include: receiving an indication of an event via a calendaring system of mobile device and/or the computing device ("RECEIVE EVENT DATA," block 410); identifying a property of the event, event time, and a duration of the event that is related to the bandwidth allocation that may be needed for the event ("IDENTITY EVENT PROPERTY," block 412); determining an estimation of bandwidth usage of the mobile device based on the identified property and duration of the event ("ESTIMATE BANDWIDTH USAGE," block 414); and allocating bandwidth to the mobile device at the event time and during the duration of the event based on the estimation of the bandwidth usage of the mobile device ("ALLOCATE BANDWIDTH," block 416). In one aspect, the property of the event can include an indication of a scheduled telephone call, text, email, or connection to the Internet implying increased bandwidth usage during the event. In another aspect, the property of the event can include an implied indication that the user will be occupied with an activity which implies decreased bandwidth usage during the event.

The computing method 400 can include the base station processing event data in order to identify a particular property of the event related to possible bandwidth usage during the event by analyzing text of the event data ("ANALYZE EVENT TEXT," block 418). The base station can include a text analyzing unit (e.g., text analyzing module), which can be included in the computing system of the base station. The text analyzing unit can be configured to search a description of the event and identify keywords of the text that can provide some indication as to bandwidth usage during the event. The keywords found can then be used to determine an estimation of bandwidth usage of the mobile device. The computing system can identify an estimated bandwidth associated with the identified keywords by, for example, having the computing system referencing a lookup table stored on a memory device of the computing system. The lookup table of the computing device can include calendar event data provided by one or more of the mobile devices that have been within the cellular area of the base station or provided by a different base station.

The computing system can analyze event data in order to obtain information helpful in estimating bandwidth associated with keywords of an event. The computing system can estimate bandwidth associated with the identified keywords and identify an average required bandwidth in previous events associated with the identified keywords, such as those stored in the lookup table. Also, the computing system can perform such analysis system wide for all devices. As soon as a mobile device enters a cell area, the base station can obtain calendar data and in real time make dynamic changes in bandwidth allocation. This can be enabled by identifying an average required bandwidth for a plurality of mobile devices connected to the wireless communication network in previous events with the identified keywords, such as those in the lookup table.

The computing system associated with the base station can identify and analyze downlink and uplink bandwidths of a calendar event in order to determine an estimation of bandwidth usage. The computing system can determine an estimated uplink bandwidth usage and an estimated downlink bandwidth usage, and utilize the estimated usage in determining allocation for an event. The allocated bandwidth can be reserved for a particular mobile device at the event time and during the duration of the event based on the estimation of the bandwidth usage from the calendar data. The computing system can allocate uplink bandwidth and downlink bandwidth based on the estimated uplink bandwidth and the estimated downlink bandwidth, respectively.

The computing system can also be configured to identify and analyze location data for a particular calendar event ("ANALYZE LOCATION DATA," block 420). The computing system can use various means to obtain location data that can provide information about possible bandwidth usage during an event at that location. The location data can be processed by the computing system in order to allocate bandwidth to a particular mobile device during the event. The computing system can reserving the allocated bandwidth at the event time and during the duration of the event in a coverage area of the wireless communication network at the identified location. To facilitate this, the computing system can include a calendaring application or module that can coordinate calendar events with allocated bandwidth for one or more mobile units. The current location of mobile devices and current calendar event can be used to dynamically adjust bandwidth allocations across the mobile devices of a cellular area.

The computing system can analyze the event data in order to identify an express indication that the mobile device will use increased bandwidth at the event time during the duration of the event ("INCREASE BANDWIDTH?," block 422). When a computing system receives an express indication of increased bandwidth usage for an event time and duration of the event, the computing system can after the event determine if the mobile device used increased bandwidth during the duration of the event. If it is determined that the mobile device used increased bandwidth during the duration of the event as expressly indicated, the computing system can determine an incentive to be provided to the user.

The computing system can analyze event data in order to identify a property of an event that provides an express indication that the mobile device will use decreased bandwidth at the event time during the duration of the event ("DECREASE BANDWIDTH?," block 424). The computer-readable storage medium of the computing systems that provide instructions for the computing system to: after the event time and duration of the event, determine if the mobile device used decreased bandwidth during the duration of the event; and if it is determined that the mobile device used decreased bandwidth during the duration of the event as expressly indicated, provide the user with an incentive. For example, an incentive the computing system can prove the user can include price discounts, credit points, or increased bandwidth during a future event.

On the other hand, if it is determined that the mobile device used increased bandwidth during the duration of the event as opposed to the projected lower bandwidth usage expressly indicated, the computing system can provide the user with a disincentive. For example, a disincentive the computing system can provide the user can include a degradation of priority during a future event.

A wireless communications systems, such as described in connection with FIG. 1 can include the computing system associated with a base station and have hardware and software for performing the computing methods described herein.

Figure 5:
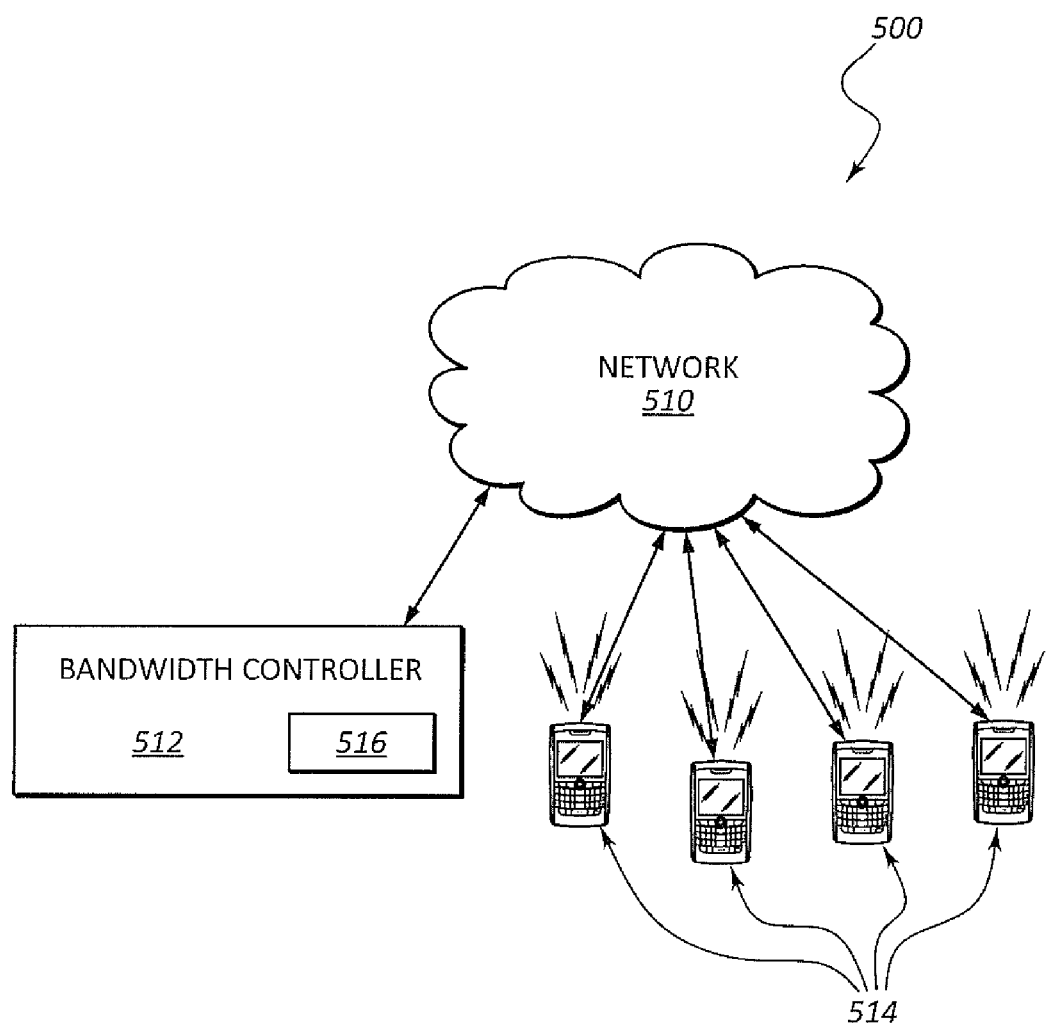
FIG. 5 provides a schematic representation of a wireless communication system that can perform dynamic bandwidth adjustment for one or more mobile devices.

FIG. 5 provides a schematic representation of a wireless communication system 500 that can perform dynamic bandwidth adjustment for one or more mobile devices. The system can include a network 510, which can be configured as any wireless communication network known or developed. The network 510 can be operably coupled with a bandwidth controller 512. The bandwidth controller 512 can be configured to allocate bandwidth of the wireless communication system 512 for one or more mobile devices 514. The mobile device 514 can be capable of communicating with the bandwidth controller 512 through the network 510 in order to request an allocation of bandwidth in the wireless communication system 500. The bandwidth controller 512 allocates the bandwidth of the wireless communication system 500 according to any of the methods or processes described herein. The bandwidth controller 512 can include a computer-readable storage medium 516 having computer executable instructions for performing dynamic bandwidth adjustment based on calendar event data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems as well as network elements, base stations, femtocells, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
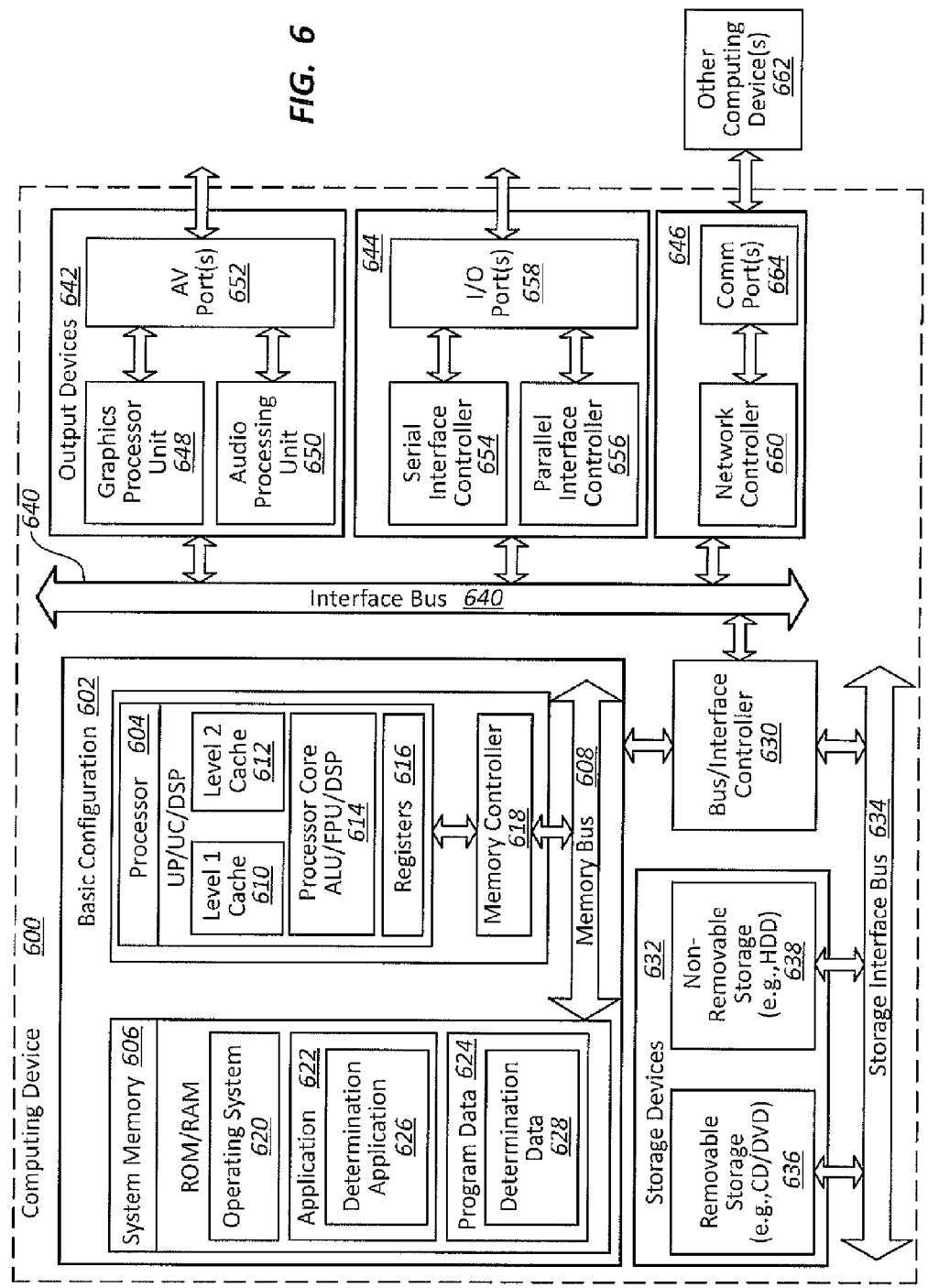
FIG. 6 shows an example computing device that is arranged to perform any of the computing methods described herein, all arranged in accordance with at least one of the embodiments described herein, and which arrangement may be modified in accordance with the disclosure provided herein by one of ordinary skill in the art.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606. The computing device 600 can be representative of any computing systems of the communications system, such as the base station or mobile phone.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof System memory 606 may include an operating system 620, one or more applications 622, and program data 624. Application 622 may include a determination application 626 that is arranged to perform the functions as described herein including those described with respect to methods described herein. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for optimizing bandwidth in a mobile communication system including a mobile device with a calendaring system operating thereon, the method comprising:
receiving an indication of an event via the calendaring system;
identifying an event time, a duration of the event, and a property of the event, the identifying the property of the event including searching a description of the event to identify keywords associated with the event;
determining an estimation of bandwidth usage of the mobile device based on the duration of the event and an average required bandwidth for the mobile device or one or more other mobile devices associated with the mobile communication system in previous events with the identified keywords; and
allocating bandwidth to the mobile device at the event time and during the duration of the event based on the estimation of the bandwidth usage of the mobile device.

2. The method of claim 1, wherein the property of the event comprises an indication of a scheduled telephone call, text, email, or connection to the Internet implying increased bandwidth usage during the event.

3. The method of claim 1, wherein the property of the event comprises an implied indication that a user of the mobile device plans to be occupied with an activity which implies decreased bandwidth usage during the event.

4. The method of claim 1, wherein the bandwidth comprises downlink and uplink bandwidths and wherein determining an estimation of bandwidth usage comprises determining an estimated uplink bandwidth usage and an estimated downlink bandwidth usage, and wherein allocating bandwidth to the mobile device at the event time and during the duration of the event based on the estimation of the bandwidth usage comprises allocating uplink bandwidth and downlink bandwidth based on the estimated uplink bandwidth and the estimated downlink bandwidth, respectively.

5. The method of claim 1, further comprising identifying a location of the event, and wherein allocating bandwidth to the mobile device comprises reserving the allocated bandwidth at the event time and during the duration of the event in a coverage area of the mobile communication system at the identified location.

6. The method of claim 1, wherein identifying a property of the event comprises identifying an express indication that the mobile device plans to use increased bandwidth at the event time during the duration of the event.

7. The method of claim 6, further comprising:
after the event time and duration of the event, determining if the mobile device used increased bandwidth during the duration of the event; and
if it is determined that the mobile device used increased bandwidth during the duration of the event as expressly indicated, providing a user of the mobile device with an incentive.

8. The method of claim 7, wherein the incentive comprises a price discount, credit points, or increased bandwidth during a future event.

9. The method of claim 1, wherein identifying a property of the event comprises identifying an express indication that the mobile device plans to use decreased bandwidth at the event time during the duration of the event.

10. The method of claim 9, further comprising:
after the event time and duration of the event, determining if the mobile device used decreased bandwidth during the duration of the event; and
if it is determined that the mobile device used decreased bandwidth during the duration of the event as expressly indicated, providing a user of the mobile device with an incentive.

11. The method of claim 10, further comprising:
if it is determined that the mobile device used increased bandwidth during the duration of the event as opposed to the expressly indicated decreased bandwidth, providing the user with a disincentive.

12. The method of claim 11, wherein the disincentive comprises a degradation of priority during a future event.

13. The method of claim 1, wherein the mobile device comprises a mobile phone, a smartphone, or a laptop computer.

14. A mobile communication system comprising:
a bandwidth controller configured to allocate bandwidth of the mobile communication system; and
a mobile device capable of communicating with the bandwidth controller in order to request an allocation of bandwidth in the mobile communication system,
wherein the bandwidth controller allocates the bandwidth of the mobile communication system according to the method recited in claim 1.

15. A computer-readable storage medium having computer-executable instructions stored thereon that are executable by a computing device capable of communicating with a mobile device via a wireless communication system, the computer-executable instructions being executable to perform operations comprising:
receiving an indication of an event via a calendaring system associated with a user of the mobile device;
identifying an event time, a duration of the event, and a property of the event, the identifying the property of the event including searching a description of the event to identify keywords associated with the event;
determining an estimation of bandwidth usage of the mobile device based on the duration of the event and an average required bandwidth for the mobile device or one or more other mobile devices associated with the wireless communication system in previous events with the identified keywords; and
allocating bandwidth to the mobile device at the event time and during the duration of the event based on the estimation of the bandwidth usage of the mobile device.

16. The computer-readable storage medium of claim 15, wherein the property of the event comprises an indication of a scheduled telephone call, text, email, or connection to the Internet implying increased bandwidth usage during the event.

17. The computer-readable storage medium of claim 15, wherein the property of the event comprises an implied indication that the user plans to be occupied with an activity which implies decreased bandwidth usage during the event.

18. The computer-readable storage medium of claim 15, wherein the bandwidth comprises downlink and uplink bandwidths and wherein determining an estimation of bandwidth usage comprises determining an estimated uplink bandwidth usage and an estimated downlink bandwidth usage, and wherein allocating bandwidth to the mobile device at the event time and during the duration of the event based on the estimation of the bandwidth usage comprises allocating uplink bandwidth and downlink bandwidth based on the estimated uplink bandwidth and the estimated downlink bandwidth, respectively.

19. The computer-readable storage medium of claim 15, wherein the operations further comprise identifying a location of the event, and wherein allocating bandwidth to the mobile device comprises reserving the allocated bandwidth at the event time and during the duration of the event in a coverage area of the wireless communication system at the identified location.

20. The computer-readable storage medium of claim 15, wherein identifying a property of the event comprises identifying an express indication that the mobile device plans to use increased bandwidth at the event time during the duration of the event.

21. The computer-readable storage medium of claim 20, wherein the operations further comprise:
after the event time and duration of the event, determining if the mobile device used increased bandwidth during the duration of the event;
if it is determined that the mobile device used increased bandwidth during the duration of the event as expressly indicated, providing the user with an incentive.

22. The computer-readable storage medium of claim 21, wherein the incentive comprises a price discount, credit points, or increased bandwidth during a future event.

23. The computer-readable storage medium of claim 15, wherein identifying a property of the event comprises identifying an express indication that the mobile device plans to use decreased bandwidth at the event time during the duration of the event.

24. The computer-readable storage medium of claim 23, wherein the operations further comprise:
after the event time and duration of the event, determining if the mobile device used decreased bandwidth during the duration of the event;
if it is determined that the mobile device used decreased bandwidth during the duration of the event as expressly indicated, providing the user with an incentive.

25. The computer-readable storage medium of claim 24, wherein the operations further comprise:
if it is determined that the mobile device used increased bandwidth during the duration of the event as opposed to the expressly indicated decreased bandwidth, providing the user with a disincentive.

26. The computer-readable storage medium of claim 25, wherein the disincentive comprises a degradation of priority during a future event.

27. A bandwidth controller for use in a wireless communication system including a plurality of wireless mobile devices, wherein the bandwidth controller comprises the computer-readable storage medium of claim 15.

28. A method of optimizing bandwidth in a mobile communication system including a mobile device, the method comprising:
- receiving an indication of an event via a calendaring system operating on the mobile device, wherein the calendaring system is configured to obtain and provide calendar event data for a user of the mobile device;
- identifying a location of the event, an event time, and a duration of the event;
- identifying a property of the event by searching a description of the event and identifying keywords within the description of the event, the property of the event providing an express indication that the mobile device plans to use either increased bandwidth or decreased bandwidth at the event time during the duration of the event;
- determining an estimation of bandwidth usage of the mobile device based on the duration of the event and an estimated bandwidth derived from an average required bandwidth of the mobile device in previous events with the identified keyword; and
- allocating bandwidth to the mobile device at the event time and during the duration of the event in a coverage area of the mobile communication system at the identified location based on the estimation of the bandwidth usage of the mobile device.

* * * * *

UNITED STATES PATENT AND TRADEMARK OFFICE
CERTIFICATE OF CORRECTION

PATENT NO. : 8,849,296 B2
APPLICATION NO. : 13/514284
DATED : September 30, 2014
INVENTOR(S) : Song It is certified that error appears in the above-identified patent and that said Letters Patent is hereby corrected as shown below:

On the Title Page, Item (75), under "Inventor", in Column 1, Line 1, delete "Yuefeng Song," and insert -- Xuefeng Song, --, therefor.

In the Specification

In Column 1, Line 45, delete "based On" and insert -- based on --, therefor.

In Column 10, Line 22, delete "("IDENTITY" and insert -- ("IDENTIFY --, therefor.

In Column 14, Line 63, delete "thereof" and insert -- thereof. --, therefor.

In Column 17, Lines 50-58, delete "B together,..........................."A and B."" and insert the same at Line 49, after "and", as a continuation paragraph.

Signed and Sealed this
Third Day of March, 2015

Michelle K. Lee
*Deputy Director of the United States Patent and Trademark Office*